United States Patent
Prinz

(10) Patent No.: US 8,025,317 B2
(45) Date of Patent: Sep. 27, 2011

(54) AXIALLY SEALING SYSTEM FOR CONNECTING FLUID-PASSED CONDUITS

(75) Inventor: Dominik Prinz, Elsdorf (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 385 days.

(21) Appl. No.: 11/755,358

(22) Filed: May 30, 2007

(65) Prior Publication Data

US 2007/0278792 A1    Dec. 6, 2007

(30) Foreign Application Priority Data

May 31, 2006   (DE) .................. 10 2006 026 361

(51) Int. Cl.
*F16L 41/00*   (2006.01)
(52) U.S. Cl. ............................... 285/208; 285/905
(58) Field of Classification Search ............... 285/381.1, 285/206, 208, 207, 905; 411/313, 314
See application file for complete search history.

(56) References Cited

U.S. PATENT DOCUMENTS

| | | | | |
|---|---|---|---|---|
| 621,456 A * | 3/1899 | Jamieson | ............... | 411/314 |
| 1,208,620 A * | 12/1916 | Moser | ............... | 411/301 |
| 1,578,160 A * | 3/1926 | Monroe | ............... | 411/313 |
| 2,374,403 A * | 4/1945 | Yarnall | ............... | 411/265 |
| 4,671,716 A * | 6/1987 | Grass | ............... | 411/156 |
| 5,308,125 A * | 5/1994 | Anderson, Jr. | ............... | 285/349 |
| 5,553,897 A * | 9/1996 | Maillot | ............... | 285/206 |
| 5,660,417 A * | 8/1997 | Reeves | ............... | 285/368 |
| 6,193,283 B1* | 2/2001 | Pickett et al. | ............... | 285/906 |
| 6,386,593 B1* | 5/2002 | Slais et al. | ............... | 285/205 |
| 6,431,614 B1* | 8/2002 | Lafer et al. | ............... | 285/206 |
| 7,168,744 B2* | 1/2007 | Ashibe et al. | ............... | 285/206 |
| 7,445,248 B2* | 11/2008 | Thaler et al. | ............... | 285/47 |

FOREIGN PATENT DOCUMENTS

| | | |
|---|---|---|
| DE | 102 61 887 B4 | 7/2004 |
| EP | 0020120 A1 | 12/1980 |

* cited by examiner

*Primary Examiner* — David E Bochna
(74) *Attorney, Agent, or Firm* — Fraser Clemens Martin & Miller LLC; J. Douglas Miller

(57) ABSTRACT

A system for connecting fluid-passed conduits which can be integrated into a refrigerant circuit of a heating, ventilation and air condition system of a motor vehicle. The system includes two connection blocks, wherein the connection blocks are joined together by a fastener having an elastically deflectable transfer component, the elastically deflectable transfer component compensates for a thermal expansion of the fastening means and the connection blocks.

20 Claims, 1 Drawing Sheet

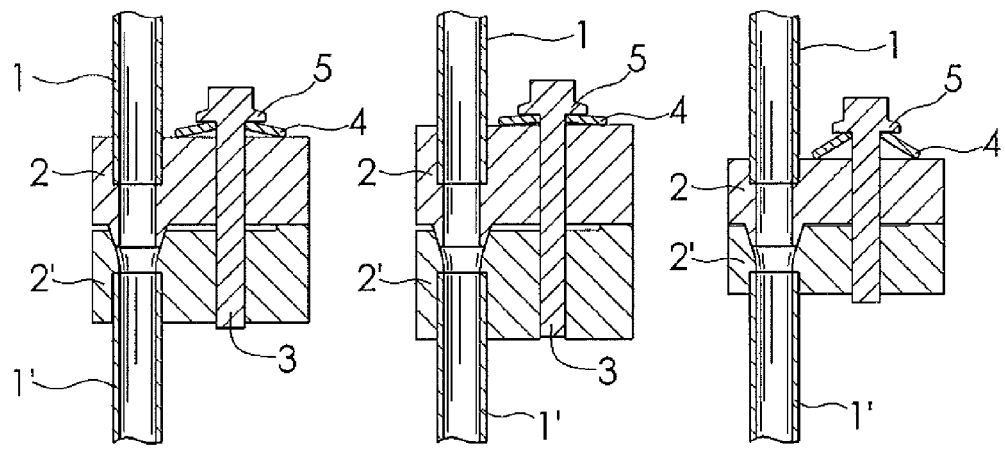
*Fig. 1A*  *Fig. 1B*  *Fig. 1C*
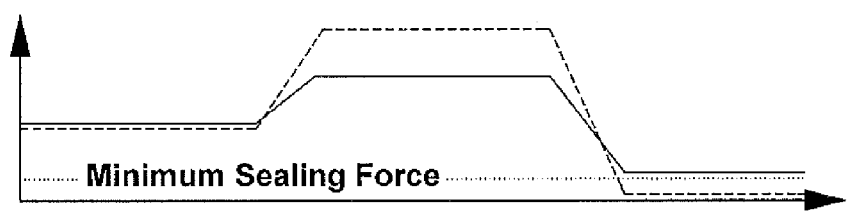
*Fig. 2*
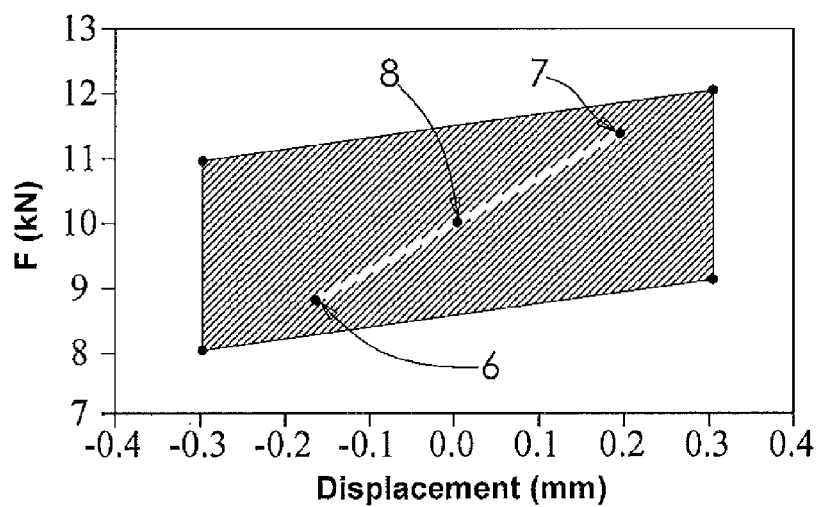
*Fig. 3*

AXIALLY SEALING SYSTEM FOR CONNECTING FLUID-PASSED CONDUITS

CROSS-REFERENCE TO RELATED APPLICATION

This application claims the benefit of German Patent Application No. 102006026361.8-12 AXIALLY SEALING SYSTEM CONNECTABLE BY SCREWING FOR CONNECTING FLUID-PASSED CONDUITS filed on May 31, 2006, hereby incorporated herein by reference in its entirety.

FIELD OF THE INVENTION

The invention relates generally to an axially sealing system for connecting fluid-passed conduits, and more particularly to an axially sealing system having a substantially uniform sealing effect over wide temperature ranges for use in a heating, ventilation, and air conditioning system in a vehicle.

BACKGROUND OF THE INVENTION

Axially sealing systems typically include at least two conically engage, fluid-passed parts, typically referred to as male and female components. The male and female components develop a sealing action when engaged and pressed to each other by a minimum pretensioning force. Some of these systems include separate sealing mediums disposed between the male and female components. Due to the specific geometry of the components, the pretensioning force may lead to maximized contact forces at surfaces which control the sealing action, such as flank surfaces, cone walls, or similar surface configurations intensifying a thrust force, for example. Therefore, depending on different operating conditions, minimum pretensioning forces are specified which are maintained over respective operating cycles, which results in a maximization of materials used.

For systems with higher operating pressures, axially fitting sealing systems which include solid metal blocks (fitting blocks, connection blocks) provided with matching male and female seal components which engage when the metal blocks are pressed to each other are often used, thus facilitating the required sealing function.

Pressing the components together is performed due to the simplicity of the connection means, which minimizes a cost thereof. However, problems arise when the pretensioning force varies, which may be caused by material fatigue, settling, different thermal coefficients of expansion of the components used or temperature variations, for example.

Air conditioning units include a number of aluminium components provided directly as sealing components of axially sealing systems, particularly when used in vehicles. However, aluminium components tend to settle and be susceptible to overloads, which can lead to irreversible damage or deformation. Furthermore, aluminium components are typically combined with components made of other materials in axially sealing systems. Due to different thermal coefficients of expansion, wider variations of temperature can cause stresses in the system, which can lead to the above mentioned overloading of the aluminium components.

Such material combinations typically are given if one fitting block of an axially sealing system is made of steel, while a corresponding fitting block is made of aluminium, wherein both blocks are pressed together by steel connection means, such as with steel bolts or screws. Bolts or screws are typically used because of a tensile strength thereof. However, these crews or bolts have a different thermal coefficient of expansion than the aluminium block. Therefore, temperature changes may cause stresses that deform the aluminium irreversibly, which may lead to a deterioration of the seal created between the components of the system. The deterioration may allow a contained fluid to leak from the system, which is undesirable.

To address this problem, fastening means are known that securely connect structural elements with different thermal coefficients of expansion to each other over wide temperature ranges without damaging the structural elements. For example, EP 0020120 A1, hereby incorporated herein by reference in its entirety, discloses the use of screws or bolts provided with disc springs to keep electrical connections in secure contact over a wide temperature range.

Further, DE 101 96 995 B4, hereby incorporated herein by reference in its entirety, discloses stapled arrangements of frame-shaped carrier components, which include a number of peltier elements that are firmly fixed to each other by means of screws or bolts with disc springs.

Both applications include screws or bolts provided with disc springs that are used to balance thermal stresses in multipart structures, thus securing permanent mechanical contact between different assemblies while the temperature varies significantly.

However, in systems which require the assembly of several components which are positionable stationary relative to each other and must be maintained in permanent contact to each other, wherein the permanent contact must be kept over a wide temperature range and surplus contact pressure must be secured in order to produce a sealing effect towards fluids, those screwed connections with an elastically deflectable transfer component, which can transfer forces produced by the connection elements to components to be held, has previously not been developed.

Additionally, an axially sealing system for use in a heating, ventilation and air conditioning system of motor vehicles having refrigerants flowing at relatively high pressures, where the sealing effect must be maintained at substantially all times; has not been developed. Further, a system which can accommodate disturbing accelerations due to shocks or vibrations, have not been developed.

Accordingly, it would be desirable to produce an improved axially sealing system for use in a heating, ventilation and air conditioning system of a vehicle, wherein a reliability, an ease of assembly, and an adaptability to various operating conditions thereof are maximized, and an amount of materials and a cost of production thereof are minimized.

SUMMARY OF THE INVENTION

Harmonious with the present invention, an improved axially sealing system for use in a heating, ventilation and air conditioning system of a vehicle, wherein a reliability, an ease of assembly, and an adaptability to various operating conditions thereof are maximized, and an amount of materials and a cost of production thereof are minimized, has surprisingly been discovered.

In one embodiment, a system for connecting fluid-passed conduits comprises: two connection blocks, one of the connection blocks having a male connection component, the other of the connection blocks having a female connection component, wherein the connection blocks are joined together by a fastening means having an elastically deflectable transfer component.

In another embodiment, an axially sealing system for connecting fluid-passed conduits comprises: two connection blocks, one of the connection blocks having a male connection component, the other of the connection blocks having a female connection component, wherein the connection blocks are sealingly engaged by a fastening means having an elastically deflectable transfer component, and wherein the elastically deflectable transfer component is pretensioned against at least one of the connection blocks.

In another embodiment, an axially sealing system for connecting fluid-passed conduits comprises: two connection blocks formed from aluminium, one of the connection blocks having a male connection component, the other of the connection blocks having a female connection component, wherein the connection blocks are sealingly engaged by a steel fastening means having an elastically deflectable transfer component, and wherein the elastically deflectable transfer component is pretensioned against at least one of the connection blocks and is dimensioned to compensate for a thermal expansion of the fastening means and the connection blocks in a temperature range of about −40° C. to about 200° C.

The invention is based, contrary to current views, on the use of screws or bolts (referred to as screws in the following) as fastening means for the connection of components of an axially sealing system the components to be held together in sealing contact, especially as part of heating, ventilation and air conditioning systems in vehicles, whereby the screws are provided with an elastically deflectable transfer component which bears pretensionedly against at least one of the components of the axially sealing system.

The use according to the invention of such connection elements in heating, ventilation and air conditioning systems of vehicles, however, is attached to various boundary conditions which will be detailed in the following.

Because of the now high pressures of the refrigerants in modern heating, ventilation and air conditioning systems, in order to achieve a reliable sealing effect in axially sealing systems, minimum pretensioning forces have now become necessary which exceed by far all forces that can act on the single components of the axially sealing systems, caused by disturbing accelerations realistically expected due to, for example, shock actions or heavy vibrations in the vehicle, even if these components are solid metal blocks. All dimensioning work, especially of the components provided to establish the sealing contact has to be based on knowledge on these minimum pretensioning forces.

Manufacture of some components of axially sealing systems partially of light metal, especially aluminium, further contributes to make neglect able to consider disturbing accelerations when dimensioning the elastically deflectable transfer components at the screws serving as fastening means to connect the components to each other, which are to be kept in sealing contact, of axially sealing systems.

In addition, use of aluminium gives reasons for the necessity to take a maximum allowable sealing force into consideration. The minimum pretensioning force to be raised with growing pressure of the refrigerant hence narrows the window for the force to be applied onto the axially sealing system for maintaining the sealing connection, if aluminium components are used. At the same time, the use of aluminium components combined with other materials, particularly some steels, raises the danger that thermally induced stresses will occur and the relatively narrow force window will be left.

Surprisingly it has been found that screws provided with elastically deflectable transfer components, especially disc springs, contrary to current views, are well suited to connect components of axially sealing systems, which are passed by fluids flowing at high pressures, also when these components are exposed to typical disturbing acceleration spectrums in motor vehicles.

Therefore the invention comprises an axially sealing system for connecting fluid-passed conduits for fluids preferably at high pressures, including two solid connection blocks, one of which is provided with a male connection component and the other is provided with a female connection component, whereby the solid connection blocks are pressed to each other by fastening means including at least one screw with an elastically deflectable transfer component such that the male and female connection components are in sealing contact to each other by the elastically deflectable transfer component of the screw against at least one of the solid connection blocks in pretensioned condition. Advantageously, the elastically deflectable transfer component is configured as a disc spring. In most cases, the solid connection blocks are formed of a metal. In order to achieve good sealing and connectability it has proved successful to make the solid connection blocks of metals with different strength properties. Particularly in fields where the final weight of a complete equipment is highly relevant as it is in automotive applications such as heating, ventilation and air conditioning systems, it is advantageous to form one of the solid connection blocks of aluminium. Steel, however, has proved to be the material of the screws or bolts.

For the usability of the described fastening means of the invention, the configuration of the elastic components is especially important. It has proved advantageous that the elastically deflectable transfer component at room temperature is pretensioned such that it bears against one of the solid connection blocks of the axially sealing system by three to six times the minimum sealing force.

Hereby, the elastically deflectable transfer component should be dimensioned such that it is capable to compensate for a thermally caused different expansion of the screw and the solid connection blocks in a temperature range of −60° C. to 160° C. If a disc spring is used as elastically deflectable transfer component, another advantage of the invention is ease of exchange and good adaptability to different requirements of use. So, for example, the elastically deflectable transfer component can alternatively be dimensioned such that it can compensate for a thermally caused different expansion of the screw and the solid connection blocks in a temperature range of −40° C. to 200° C. Further, the elastically deflectable transfer component can be dimensioned such that it can serve to compensate for tolerances of the screwing, such as tolerances of torque (10±20%) and coefficient of friction ($\mu$=0.09 to 0.15), and settling effects especially with temperature-sensitive materials, preferably aluminium.

Because of the described advantages the system according to the invention lends itself to be integrated into a refrigerant circuit of an air conditioning unit. Particularly, it is suitable to be integrated into a refrigerant circuit of a heating, ventilation and air conditioning system of a vehicle.

An axially sealing system according to the invention lends itself to be used wherever it is important that a permanent, fluid-tight connection of fluid-passed channels is established.

Due to the permanent sealing action, the exit of refrigerants into the environment is clearly reduced, for example, in air conditioning units, which is highly estimated considering ecological aspects, also reducing service demands as refilling is only seldom required.

The manufacturer of an air conditioning unit with seals according to the invention can allow longer guarantee periods, which is highly effective in marketing, the end user has lower operational costs. Risk of damage to the plant due to unnoticed loss of refrigerant is reduced while service costs become lower.

BRIEF DESCRIPTION OF THE DRAWINGS

The above and other objects and advantages of the invention will become readily apparent to those skilled in the art from reading the following descriptions of several embodiments of the invention when considered in the light of the accompanying drawings in which:

FIGS. 1A-1C are side section views of an axially sealing system according to an embodiment of the invention and shown at different operating temperatures;

FIG. 2 is a graph illustrating sealing forces produced by the axially sealing system illustrated in FIGS. 1A-1C; and FIG. 3 is a graph illustrating force/displacement with a marked parameter field of elastically deflectable transfer components which are suitable for use in systems according to the invention.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

FIGS. 1A-1C show a representation of an axially sealing system according to the invention at different operation temperatures in connection with sealing forces developed in each case. FIG. 2 represents the sealing forces occurring at the different operation temperatures in relative units, which are plotted as a solid line. For comparison, the sealing forces which occur at the same operating temperatures using conventional fastening means without elastically deflectable transfer components are plotted as dashed line.

FIG. 1A shows an axially sealing system for connecting fluid-passed conduits 1, 1', for fluids at a high pressure, which includes two solid connection blocks 2, 2', whereby one has a male connection component and the other has a female connection component. The solid connection blocks 2, 2' are pressed against each other by fastening means 3, such as a screw, for example, with an elastically deflectable transfer component 4, such as a disc spring, for example and a screw head 5. The male and female connection components are in sealing contact with each other by the elastically deflectable transfer component 4 of the fastening means 3 under pretension support against at least one of the solid connection blocks 2, 2' of the axially sealing system. The fastening means 3 is screwed to the lower solid connection block 2', which is formed of stainless steel, for example, which includes a female thread for this purpose. The fastening means 3 passes through a hole in the upper solid connection block 2, which is formed of aluminium, for example, and slightly rises above the upper solid connection block 2 on its top. The distance created between the top of the upper solid connection block 2 and a bottom portion of the screw head 5 is bridged by the pretensioned elastically deflectable transfer component 4.

The system shown in FIG. 1A is operated at room temperature, or in a range from about 18° C. to about 24° C. The pretension of the elastically deflectable transfer component 4 is set such that a mean sealing force distinctly above the minimum sealing force develops. The deflection of the elastically deflectable transfer component 4 allows further deflection in both directions.

FIG. 1B shows the axially sealing system at an operating temperature of 200° C. The solid connection blocks 2, 2' expanded significantly longer than the fastening means 3 due to the different material-specific thermal coefficients of expansion of the respective materials. Deflection of the elastically deflectable transfer component 4 appears to be short before having reached a stop at the upper solid connection block 2. The sealing force created by the system at 200° C. is maximized with respect to the sealing force created by the system at room temperature.

FIG. 1C shows the axially sealing system at an operating temperature of −40° C. The solid connection blocks 2, 2' expanded significantly shorter than the fastening means 3 due to the different material-specific thermal coefficients of expansion of the respective materials. Deflection of the elastically deflectable transfer component 4 appears to be short before lifting off from the upper solid connection block 2. The sealing force created by the system at −40° C. is significantly reduced with respect to the sealing force created by the system at room temperature and at 200° C. Nevertheless, sufficient sealing function is facilitated by the axially sealing system.

FIG. 2 shows the sealing forces facilitated by the axially sealing system of the invention, drawn as a solid line, compared to the sealing forces which develop at the same different operating temperatures using conventional fastening means without elastically deflectable transfer components, drawn as a dashed line.

In the first region (at room temperature), the sealing forces are substantially identical, and can be set by corresponding adjustment of the components of the axially sealing system. The sealing force facilitated by conventional fastening means is higher than the sealing force facilitated by the axially sealing system according to the invention during operation at 200° C. On the other hand the sealing force facilitated by conventional means drops sharply when cooling to −40° C. In this case the sealing force facilitated by conventional means falls below the minimum sealing force, which may create a danger of leaking refrigerant, which is undesirable. The sharp drop of the sealing force can be caused as a result of too high of an increase of the sealing force during heating to 200° C., thus causing irreversible deformations of the aluminium components. Alternatively, damage could have occurred as a result of excessive sealing forces. As shown by FIG. 2, the sealing force facilitated by the axially sealing system according to the invention stays above the minimum sealing force.

FIG. 3 shows a force/displacement diagram with marked parameter field of elastically deflectable transfer components, which are suitable for use in systems according to the invention, including a disc spring, for example. Dependent on the respective deflection of the fictitious disc spring, a minimum restoring force is created in an arrangement according to the invention, which can be derived from the respective maximum permissible sealing force and a maximum permissible restoring force, which can be derived from the maximum permissible sealing force and the load carrying capacity of the most sensitive components, such as aluminium components, for example. Both restoring forces form the upper and lower limits of the hatched area, which marks the parameter field, in which the force/displacement courses of disc springs must run. Each disc spring and each elastically deflectable transfer component can be used as an elastically deflectable transfer component, as defined by the invention, in regions where this function runs within the hatched area. For example, a force/displacement course of a suitable disc spring is plotted in FIG. 3, whereby the points of the minimum deflection 6, maximum deflection 7, and deflection at room temperature 8 are marked separately.

A dimensioning example is given of a system according to the invention as shown in FIGS. 1A-1C: A lower solid connection block 2' formed from stainless steel with a male connection component has a thickness of 20 mm and a thermal coefficient of expansion of 1.60 E-05 1/K. An upper solid connection block 2 formed from aluminium with a female connection component has a thickness of 20 mm and a thermal coefficient of expansion of 2.40 E-05 1/K. A fastening means 3 connecting both solid connection blocks, provided with a elastically deflectable transfer component 4, is formed of steel, has an effective length of 40 mm and a thermal coefficient of expansion of 1.10 E-05 1/K. The thermal length deviation is in a temperature range of between 160° C. and −60° C. ranges from 0.0576 mm to −0.0216 mm. The initial spring force to ensure a sealing force of approximately 2 kN is set to approximately 10 kN to take into consideration lever effects, internal pressures, environmental conditions and settling, for example. The disc spring 4 has a spring constant of approximately 20 kN and is provided for a deflection of 0.4 mm. It is understood that the system can be adapted to other operating conditions using differently dimensioned elastically deflectable transfer components 4 as desired.

Therefore the invention includes an axially sealing system for connecting fluid-passed conduits for fluids preferably at high pressures, including two solid connection blocks, one of which is provided with a male connection component and the other is provided with a female connection component, whereby the solid connection blocks are pressed to each other by fastening means including at least one screw with an elastically deflectable transfer component such that the male and female connection components are in sealing contact to each other by that the elastically deflectable transfer component of the screw bears against at least one of the solid connection blocks in pretensioned condition. Advantageously, the elastically deflectable transfer component is configured as a disc spring. In most cases, the solid connection blocks are formed of a metal. In order to achieve good sealing and connectability it has proved successful to make the solid connection blocks of metals with different strength properties. Particularly in fields where the final weight of a complete equipment is highly relevant as it is in automotive applications such as heating, ventilation and air conditioning systems, it is advantageous to form one of the solid connection blocks of aluminium. Steel, however, has proved to be the material of the screws or bolts.

For the usability of the described fastening means of the invention, the configuration of the elastic components is especially important. It has proved advantageous that the elastically deflectable transfer component at room temperature is pretensioned such that it bears against one of the solid connection blocks of the axially sealing system by three to six times the minimum sealing force.

Hereby, the elastically deflectable transfer component should be dimensioned such that it is capable to compensate for a thermally caused different expansion of the screw and the solid connection blocks in a temperature range of −60° C. to 160° C. If a disc spring is used as elastically deflectable transfer component, another advantage of the invention is ease of exchange and good adaptability to different requirements of use. So, for example, the elastically deflectable transfer component can alternatively be dimensioned such that it can compensate for a thermally caused different expansion of the screw and the solid connection blocks in a temperature range of −40° C. to 200° C. Further, the elastically deflectable transfer component can be dimensioned such that it can serve to compensate for tolerances of the screwing, such as tolerances of torque (10±20%) and coefficient of friction (μ=0.09 to 0.15), and settling effects especially with temperature-sensitive materials, preferably aluminium.

Because of the described advantages the system according to the invention lends itself to be integrated into a refrigerant circuit of an air conditioning unit. Particularly, it is suitable to be integrated into a refrigerant circuit of a heating, ventilation and air conditioning system of a vehicle.

An axially sealing system according to the invention lends itself to be used wherever it is important that a permanent, fluid-tight connection of fluid-passed channels is established.

Due to the permanent sealing action, the exit of refrigerants into the environment is clearly reduced, for example, in air conditioning units, which is highly estimated considering ecological aspects, also reducing service demands as refilling is only seldom required.

The manufacturer of an air conditioning unit with seals according to the invention can allow longer guarantee periods, which is highly effective in marketing, the end user has lower operational costs. Risk of damage to the plant due to unnoticed loss of refrigerant is reduced while service costs become lower.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for connecting fluid-passed conduits comprising:
    two connection blocks formed from different materials, wherein the connection blocks are sealingly abutted by a fastening means; and
    an elastically deflectable transfer component disposed adjacent a portion of the fastening means and pretensioned against one of the connection blocks by about three to about six times the minimum sealing force.

2. The system for connecting fluid-passed conduits according to claim 1, wherein the elastically deflectable transfer component is a disc spring.

3. The system for connecting fluid-passed conduits according to claim 1, wherein a first one of the connection blocks is formed from a first metal material and a second one of the connection blocks is formed from a second metal material.

4. The system for connecting fluid-passed conduits according to claim 3, wherein the first metal material is aluminium and the second metal material is steel.

5. The system for connecting fluid-passed conduits according to claim 4, wherein the fastening means extends through the first one of the connection blocks formed from the first metal material and is in threaded engagement with the second one of the connection blocks formed from the second metal material.

6. The system for connecting fluid-passed conduits according to claim 1, wherein the connection blocks receive the fastening means therein.

7. The system for connecting fluid-passed conduits according to claim 1, wherein the elastically deflectable transfer component is pretensioned at a temperature in a range from about 18° C. to about 24° C.

8. The system for connecting fluid-passed conduits according to claim 7, wherein the elastically deflectable transfer component is dimensioned to compensate for a thermal expansion of the fastening means and the connection blocks in a temperature range of about −40° C. to about 200° C.

9. The system for connecting fluid-passed conduits according to claim 1, wherein the system is adapted to be integrated into a refrigerant circuit of an air conditioning unit.

10. The system for connecting fluid-passed conduits according to claim 1, wherein the system is adapted to be integrated into a refrigerant circuit of a heating, ventilation and air condition system of a motor vehicle.

11. An axially sealing system for connecting fluid-passed conduits comprising:
   two connection blocks formed from different materials, wherein the connection blocks are sealingly abutted by a fastening means; and
   a disc spring abutting a portion of the fastening means, wherein the disc spring is pretensioned against at least one of the connection blocks by about three to about six times the minimum sealing force.

12. The system for connecting fluid-passed conduits according to claim 11, wherein a first one of the connection blocks is formed from a first metal material and a second one of the connection blocks is formed from a second metal material.

13. The system for connecting fluid-passed conduits according to claim 12, wherein the first metal material is aluminium and the second metal material is steel.

14. The system for connecting fluid-passed conduits according to claim 12, wherein the fastening means extends through the first one of the connection blocks formed from the first metal material and is in threaded engagement with the second one of the connection blocks formed from the second metal material.

15. The system for connecting fluid-passed conduits according to claim 11, wherein the disc spring is pretensioned against one of the connection blocks at a temperature in a range from about 18° C. to about 24° C.

16. The system for connecting fluid-passed conduits according to claim 15, wherein the disc spring is dimensioned to compensate for a thermal expansion of the fastening means and the connection blocks in a temperature range of about −40° C. to about 200° C.

17. An axially sealing system for connecting fluid-passed conduits comprising:
   a first connection block formed from a first metal material and a second connection block formed from a second metal material, wherein the connection blocks are sealingly abutted by a fastening means; and
   an elastically deflectable transfer component abutting a portion of the fastening means, wherein the elastically deflectable transfer component is pretensioned against at least one of the connection blocks by about three to about six times the minimum sealing force at a temperature in a range from about 18° C. to about 24° C. and is dimensioned to compensate for a thermal expansion of the fastening means and the connection blocks in a temperature range of about −40° C. to about 200° C.

18. The system for connecting fluid-passed conduits according to claim 17, wherein the elastically deflectable transfer component is a disc spring.

19. The system for connecting fluid-passed conduits according to claim 17, wherein the first metal material is aluminum and the second metal material is steel.

20. The system for connecting fluid-passed conduits according to claim 19, wherein the fastening means extends through the connection block formed from the first metal material and is in threaded engagement with the connection block formed from the second metal material.

* * * * *